United States Patent [19]

Cairnes et al.

[11] 4,094,417
[45] June 13, 1978

[54] SHELVING AND DISPLAY SYSTEMS AND THE LIKE

[75] Inventors: Denis Alan Cairnes; Derrick John Maltby, both of London, England

[73] Assignee: Cairnes Maltby Associates Limited, London, England

[21] Appl. No.: 761,955

[22] Filed: Jan. 24, 1977

[30] Foreign Application Priority Data

Jan. 29, 1976 United Kingdom ............... 3618/76

[51] Int. Cl.² .................................................. A47F 5/00
[52] U.S. Cl. .................................... 211/183; 108/111; 211/182; 403/175
[58] Field of Search ............... 211/182, 204, 186, 183, 211/189, 206, 205, 187, 190; 108/111; 248/159; 403/175, 178, 170, 174; 46/26, 29

[56] References Cited

U.S. PATENT DOCUMENTS

| 1,401,057 | 12/1921 | Elliott | 248/159 X |
| 1,918,116 | 7/1933 | Mansfield | 403/175 X |
| 3,747,885 | 7/1973 | Ciancimino | 211/182 X |
| 3,851,601 | 12/1974 | Davis | 108/111 X |
| 3,898,939 | 8/1975 | Grachten | 108/111 X |
| 3,968,882 | 7/1976 | Mello | 211/189 |
| 4,021,128 | 5/1977 | Chiames | 108/111 X |
| 4,023,505 | 5/1977 | Fleck | 108/111 X |

FOREIGN PATENT DOCUMENTS

| 483,819 | 2/1970 | Switzerland | 46/29 |
| 183,985 | 8/1922 | United Kingdom | 403/175 |

*Primary Examiner*—Roy D. Frazier
*Assistant Examiner*—Robert W. Gibson, Jr.
*Attorney, Agent, or Firm*—Brisebois & Kruger

[57] ABSTRACT

A bracket device for a shelving or display system consists of a body and one or more support members removably attached to the body. The bracket body is adapted to be mounted on an upright. It has a series of open ended, part-circular recesses disposed in and about its periphery for receiving support members. Each support member has a corresponding part-circular tapered part which slides into and engages one of the recesses so as to be retained in the recess and another part for projecting through the mouth of the recess and supporting an element of the shelving or display system.

9 Claims, 8 Drawing Figures

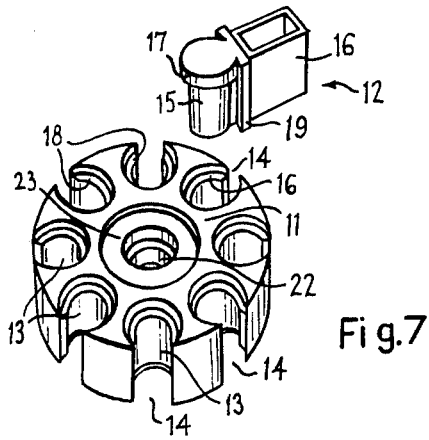
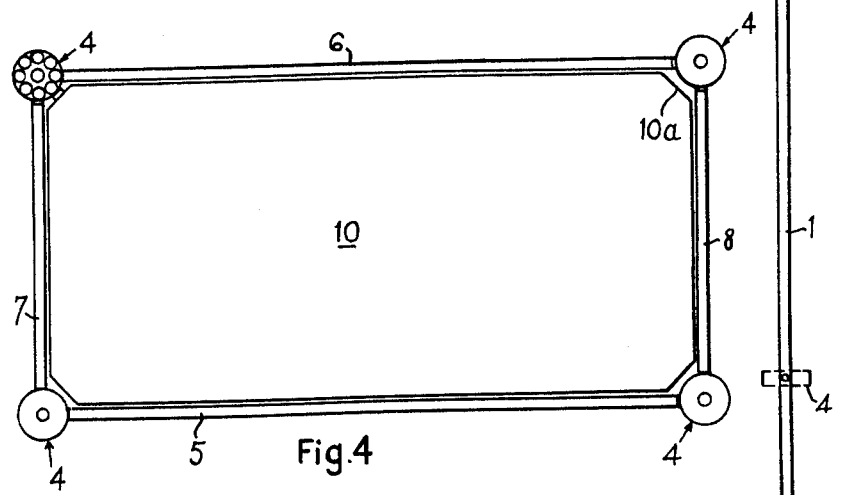
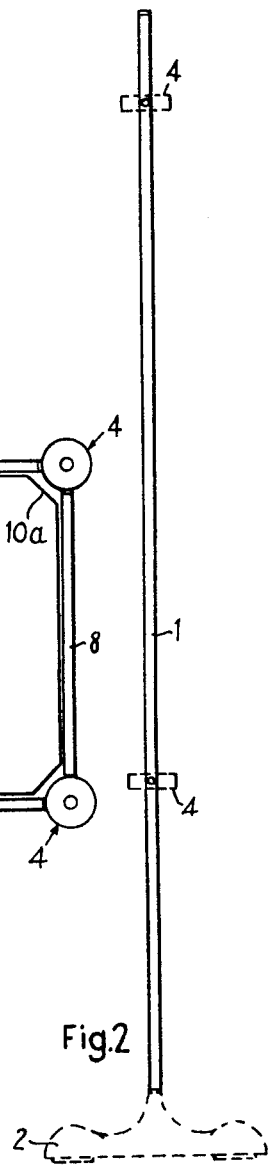

4,094,417

SHELVING AND DISPLAY SYSTEMS AND THE LIKE

BACKGROUND OF THE INVENTION

The present invention relates to shelving systems, display systems and the like and, more particularly, to a bracket device for use in such systems.

SUMMARY OF THE INVENTION

The invention consists in a bracket device for a shelving or display system, comprising a body having a plurality of recesses disposed in and about the periphery of the body with their axes substantially parallel, said recesses being open at both ends of the body, and a support member for supporting an element of the shelving or display system from the body comprising a body-engaging part and a projecting part, said body-engaging part being slidable into a selected recess via either one of said open ends thereof with the projecting part projecting from the periphery of the body, said body-engaging part and the body having cooperating means to retain the support member in the recess when the support member is inserted therein.

Preferably, each of the recesses is of generally part-circular shape and subtends an angle of more than 180° at its axis so as to have a mouth which is of restricted width at the periphery of the body. The body may, for example, have eight such recesses. The body-engaging part of the support member may be part-circular in cross-section and may be tapered to facilitate sliding it into a recess.

The recesses may be disposed at equally spaced positions around the body in a generally circular array. The body and/or support member may be moulded of a plastics material.

The invention also consists in a shelving or display system comprising uprights, one or more bracket devices as described above, and shelving or display elements mounted on the uprights by means of said bracket devices, wherein the body of the or each bracket device is secured to one of the uprights, the projecting parts of the support members are secured to or engage said elements, and the body-engaging parts of said support members are disposed in selected recesses of the bodies secured to the uprights.

BRIEF DESCRIPTION OF THE DRAWINGS

In order that the invention may be more readily understood, reference will now be made to the accompanying drawings, in which:

FIG. 2 illustrates one tubular upright and foot of the system shown in FIG. 1,

FIG. 4 is a plan view of the shelving system shown in FIG. 3, FIG. 7 is a perspective view of one embodiment of a bracket device employed in the panel display and shelving systems.

DETAILED DESCRIPTION OF THE INVENTION

Figure 1:
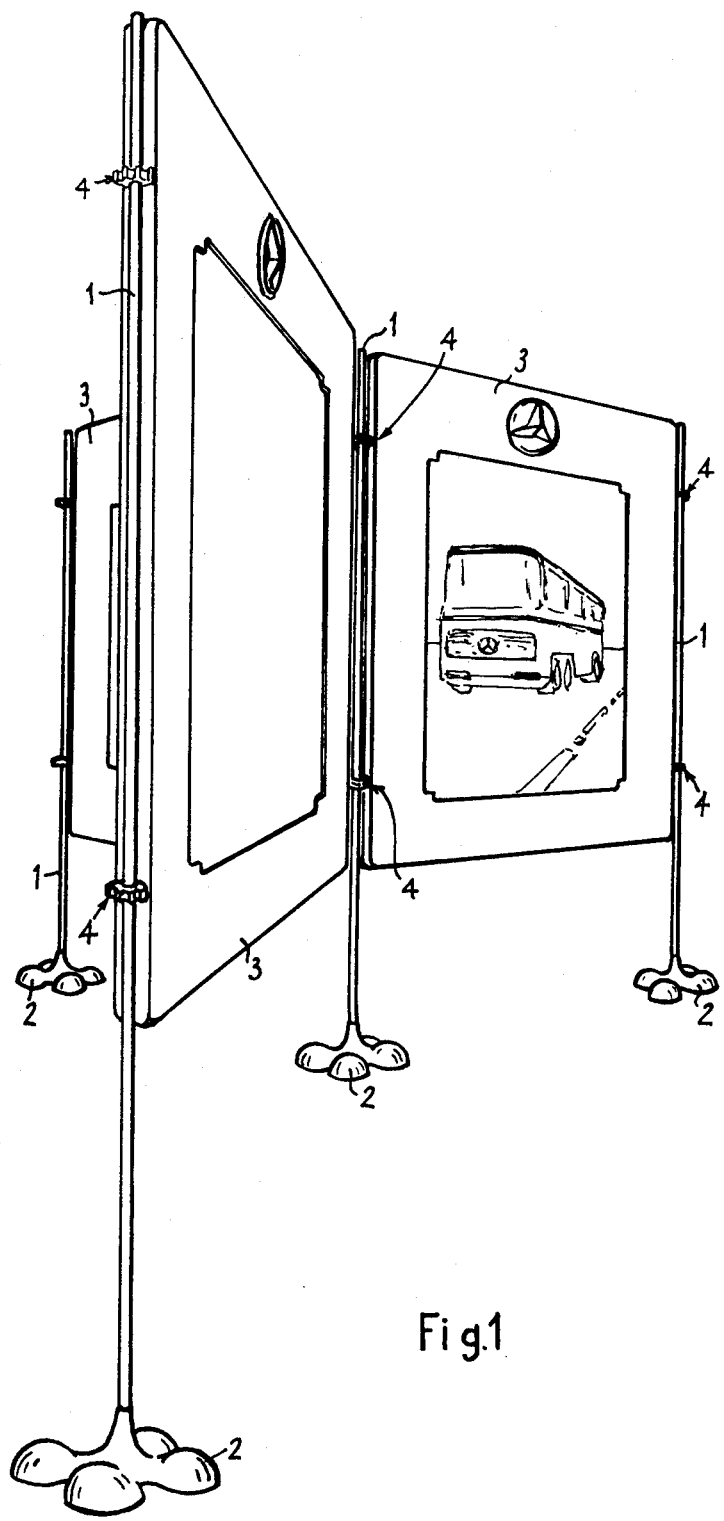
FIG. 1 is a perspective view of a panel display system embodying the invention.
Figure 3:
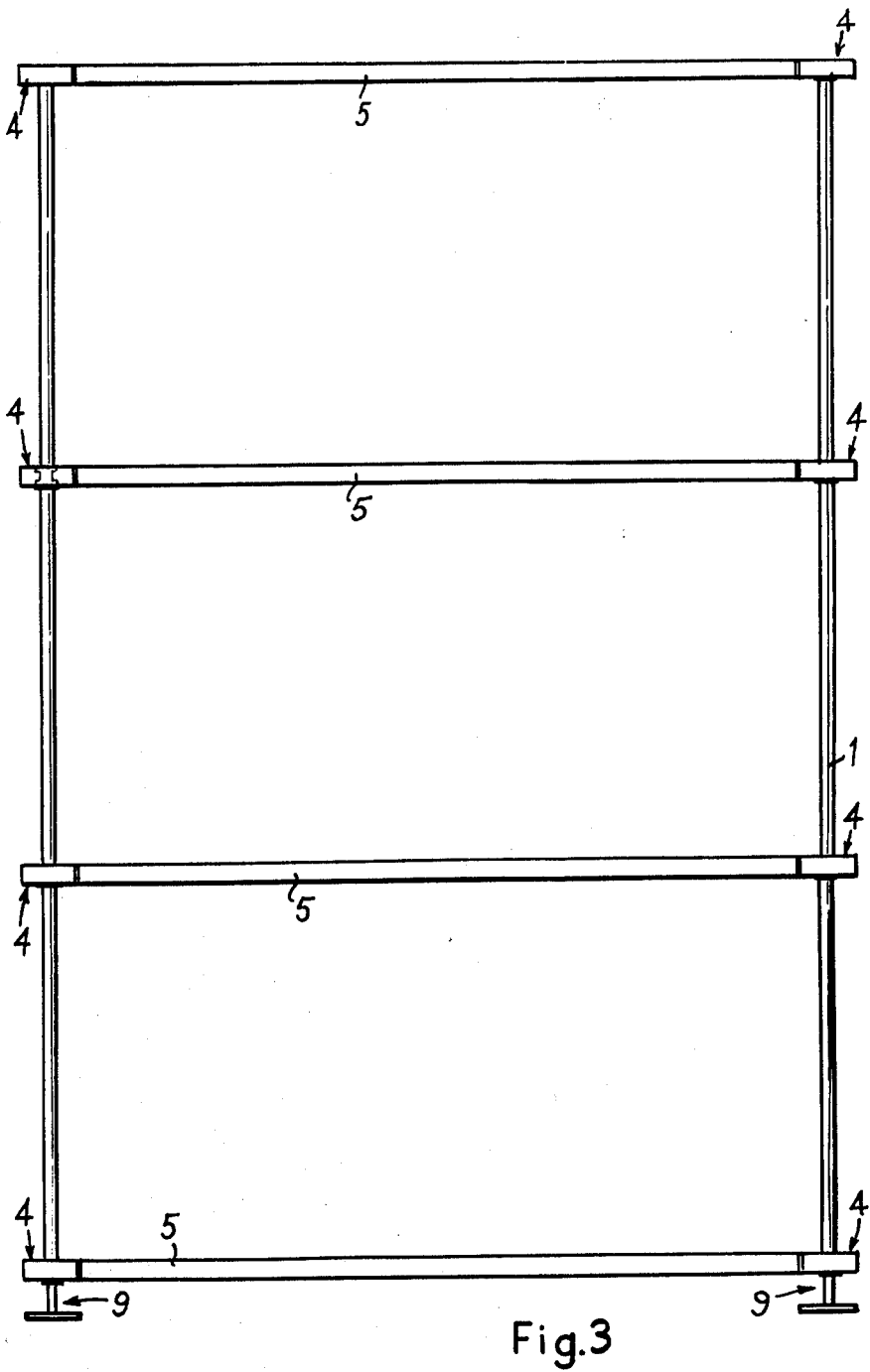
FIG. 3 is a front elevation of part of a shelving system embodying the invention.

Referring to FIGS. 1 and 2 a panel display system comprises epoxy coated steel tubular uprights 1 mounted on pedestals or feet 2, and styrene display panels 3 supported between adjacent uprights 1 by means of bracket devices 4, which will hereinafter be more fully described with reference to FIG. 7.

In this display system each foot 2 is of a shell construction which is filled with plaster or other heavy material so that the uprights cannot easily be knocked over.

FIGS. 3, 4, 5 and 6 illustrate a shelving system comprising four tubular uprights 1, four shelves 10 supported by respective bracket devices 4 mounted on the uprights 1, and horizontal tubular frame members 5, 6, 7 and 8 extending between uprights 1 and adjacent to the edges of shelves 10. In this embodiment the uprights 1 are shown mounted on light plastics feet 9 which are screwed into the bottoms of the uprights.

Figure 6:
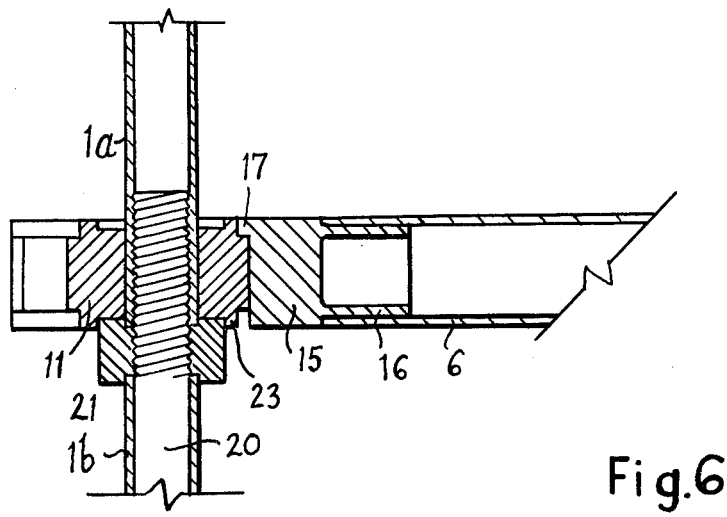
FIG. 6 shows a cross-section of part of FIG. 4.

Each bracket device 4, as shown in FIGS. 6 and 7, comprises a generally cylindrical body 11 and one or more support members 12. The body and support members are formed as plastics mouldings. The body 11 has eight part-circular recesses 13 disposed at equally spaced positions around the body 11 in a generally circular array. These recesses are open at opposite ends and are disposed in and about the periphery of the body with their axes substantially parallel. Each recess subtends an angle of more than 180° at its axis so that it has a mouth 14 which is of restricted width at the periphery of the body.

The support member 12 comprises a body-engaging part 15, and a hollow projecting part 16. The body-engaging part 15 is part-circular in cross-section and is tapered to facilitate sliding it into a selected recess 13 via one of its open ends and, when the part 15 is inserted into a recess, the projecting part 16 projects from the periphery of the body 11 through the mouth 14 of the recess. In order to prevent the body-engaging part passing through the recess the body-engaging part 15 has a shoulder 17, adjacent its larger end, which abuts a corresponding shoulder 18 provided around the wall of each recess 13 thereby to retain the body-engaging part in the recess. In the present embodiment each recess 13 has two shoulders 18, adjacent opposite open ends so that the body-engaging part 15 can be introduced into a recess via either end and be retained therein in the same manner.

The support member 12 also has an intermediate flange 19 between the body-engaging part 15 and the projecting part 16. Portion 19 is wider than the mouth of each recess 13 and when the body-engaging part 15 is located in a recess 13 the edges of the portion 19 abut the periphery of the body 11 on opposite sides of the mouth 14 to provide additional support.

The manner in which a bracket device 4 is fixed to a tubular upright is shown in FIG. 6. Each tubular upright consists of a plurality of individual tubular members only two of which 1a and 1b are shown in the Figure. The lower end of tubular member 1a is internally threaded and is screwed onto the threaded end of a stud 20 which extends into the upper end of tubular member 1b. A nut 21 is screwed onto the inner part of the threaded end of stud 20 and is located between the lower end of tubular member 1a and the upper end of tubular member 1b. The body 11 of each bracket device 4 has a central hole 22 through which tubular member 1a extends. The body 11 is supported by the nut 21 which rests in an annular recess 23 disposed in the bottom of the body 11 around the central hole 22.

Figure 8:
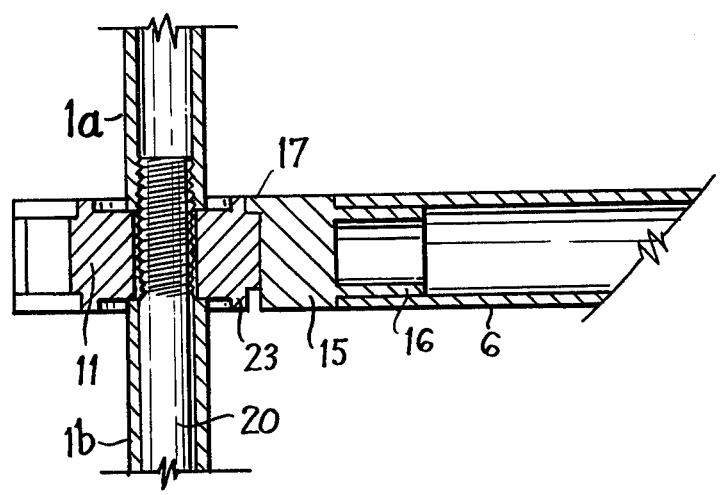
FIG. 8 is a view similar to FIG. 6 illustrating a modification.

FIG. 8 illustrates a modified form of fixing for the body. In this modification the body has a smaller diameter central hole 23 than in FIG. 6. The nut 21 is omitted and the body 11 is clamped between the lower end of tubular member 1a and the upper end of tubular member 1b so as to fix it to the tubular upright.

Figure 5:
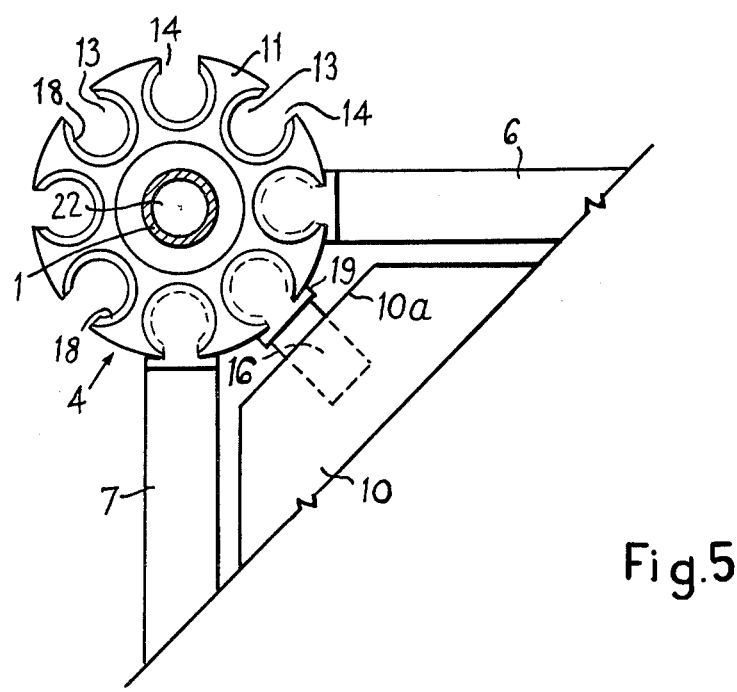
FIG. 5 is a fragmentary view of a bracket device used in FIG. 4.

The body-engaging part 15 of a support member is shown in FIG. 5 located in one of the recesses 13. In order to support elements of a display or shelving system such as panels 3, shelves 10 or frame members 5, 6, 7 and 8, the projecting parts 16 may be secured to these elements. In FIG. 1 the projecting parts 16 of the support members 12 are secured in the side edges of the panels 3. In FIG. 5 the shelves have cut-off corner parts 10a each of which is disposed adjacent a respective bracket device 4. Here the projecting parts 16 are secured in the edges of the cut-off corner parts 10a of the shelves. In FIG. 6, the projecting part 16 of the support member 12 is inserted in and secured in the adjacent end of the tubular frame member.

Whilst particular embodiments have been described it will be understood that modifications can be made without departing from the scope of the invention. For example, the projecting parts 16 of the support members 12 need not be positively secured to the elements which they support, but may merely act as supports. For instance each of the cut-off corners 10a of the shelves 10 may merely rest on projecting part 16.

Furthermore, in a preferred modification bracket body 11 may be provided with a smaller central hole so that it may be fitted over the threaded end of stud 20 and be trapped between the upper end of lower tube 1b and the lower end of upper tube 1a into which stud 20 is screwed. The nut 21 is omitted from this position but may be used on feet 9 as a lock nut at the bottom of the tubular uprights. The nut may also be screwed onto the stud associated with the topmost bracket body on each upright to secure the body thereto.

What is claimed is:

1. A bracket device for shelving systems, display systems and the like, comprising:
   a body;
   said body having a plurality of recesses disposed in and about the periphery thereof with the axes of said recesses being substantially parallel;
   said recesses being opened at both ends of the body;
   at least one support member for supporting an element of said systems from said body;
   said support member comprising a body-engaging part and a projecting part;
   said body-engaging part being slidable into a selected recess via either one of said open ends thereof with said projecting part projecting from the periphery of said body;
   cooperating means on said body-engaging part and said body for retaining said support member in position when said support member is inserted into said recess, said cooperating means including shoulders on said body-engaging part and said body, each recess in the body having one of said shoulders adjacent each open end thereof, whereby when said body-engaging part is inserted into a selected recess via either open end, the shoulder on the body-engaging part abuts one of said shoulders adjacent the ends of said recess to retain said body-engaging part in said recess.

2. A bracket device as claimed in claim 1, wherein said recesses are disposed at substantially equally spaced positions around said body in a generally circular array, each of said recesses being of generally part-circular shape and subtending an angle of more than 180° at said axis thereof so that each recess includes a mouth of restricted width at the periphery of said body, and wherein said body-engaging part of said support member is part-circular in cross-section.

3. A bracket device as claimed in claim 1, wherein said body-engaging part of said support member is tapered to facilitate sliding it into said selected recess.

4. A bracket device as claimed in claim 1, wherein said support member includes an intermediate flange between said body-engaging part and said projecting part, said intermediate flange being wider than said mouth of each recess, whereby when said body-engaging part is located in a recess said intermediate flange abuts the periphery of the body on opposite sides of said mouth to provide additional support.

5. In a system including at least one bracket device as claimed in claim 1,
   at least one upright,
   pedestal means for supporting said upright in upright position,
   said upright comprising a plurality of upright members disposed in end-to-end relation,
   means fastening said upright members together in end-to-end relation,
   the body of said bracket device having a central hole,
   said bracket device being secured in position adjacent the junction between opposing ends of adjacent end-to-end upright members with said upright extending through said central hole in said bracket device,
   said fastening means including means for supporting said bracket device adjacent said junction.

6. In a system as claimed in claim 6,
   said upright is tubular,
   the lower end of the upper one of the adjacent end-to-end upright members is internally threaded,
   stud means extends upwardly from the lower one of said adjacent upright members,
   the upper end of said stud means is threaded,
   a collar,
   said collar is internally threaded,
   said lower end of the upper adjacent upright member is screwed onto the threaded upper end of said stud means so that said two upright members are fastened together,
   said collar is located between the lower end of said upper upright member and the upper end of said lower upright member and screwed onto the threaded stud means so as to form the supporting means for said bracket device,
   the lower end of said upper upright member extends downwardly into the central hole of the said bracket device and said bracket device is supported on said collar.

7. In a system as claimed in claim 6,
   said upright is tubular,
   the lower end of the upper one of the adjacent end-to-end upright members is internally threaded,
   stud means extends upwardly from the lower one of said adjacent upright members,
   the upper end of said stud means is threaded, said lower end of the upper adjacent upright member is screwed onto the threaded upper end of said stud means so that said two upright members are fastened together, said central hole of said bracket device is fitted over the threaded end of said stud means and said bracket body is clamped between the lower end of said upper upright member and the upper end of said lower upright member.

8. A bracket device as claimed in claim 1, wherein said body and at least one support member are made of plastics material, the recesses in the body are disposed at substantially equally spaced positions around the periphery of the body in a generally circular array, each of said recesses are of generally part-circular shape and subtend an angle of more than 180° at said axis thereof whereby each recess includes a mouth of restricted width at the periphery of said body, said body-engaging part of said support member is correspondingly part — circular in cross-section and tapered to facilitate sliding it into said selected recess, said support member includes an intermediate flange between said body-engaging part and said projecting part, said flange being wider than said mouth of each recess, whereby when said body-engaging part is located in the selected recess said flange abuts the periphery of the body on opposite sides of said mouth, said body includes a generally central hole and a coaxial annular recess on at least one side of said body.

9. In a system including a plurality of bracket devices as claimed in claim 8, a plurality of tubular uprights, pedestal means made of plastics material for supporting said uprights in upright positions, each of said uprights comprises a plurality of tubular upright members disposed in end-to-end relation, stud means engaged in juxtaposed ends of adjacent end-to-end upright members to fasten said adjacent upright members together, collar means for supporting bracket devices adjacent the junction between the juxtaposed ends of adjacent end-to-end upright members, each of said pedestal means has upstanding means which are located in the associated lowermost tubular upright member thereby to support the respective tubular upright, said bracket devices are secured in position adjacent junctions between juxtaposed ends of adjacent end-to-end upright members with the stud means passing through the central holes of the bodies of said bracket devices, an upper part of each collar means is seated in the annular recess in each associated body thereby to support each said body, the uppermost upright member of each tubular upright has stud means extending upwardly from the upper end thereof and through the central hole of one said bracket device and an associated means fixing the body of each said latter bracket device at the upper end of each uppermost upright member.

* * * * *